United States Patent
Belpaire et al.

(10) Patent No.: US 8,746,780 B2
(45) Date of Patent: Jun. 10, 2014

(54) STRUCTURAL REINFORCER WITH BONDING MATERIAL ON ORTHOGANAL SURFACES

(75) Inventors: Vincent Belpaire, Uccle (BE); Sebastien Delneufcourt, Namur (BE); Francois Godillon, Valenciennes (FR); Gaetan Lison, Berchem-St-Agathe (BE)

(73) Assignee: Sika Technology AG, Baar (CH)

( * ) Notice: Subject to any disclaimer, the term of this patent is extended or adjusted under 35 U.S.C. 154(b) by 21 days.

(21) Appl. No.: 12/869,905

(22) Filed: Aug. 27, 2010

(65) Prior Publication Data

US 2011/0049323 A1 Mar. 3, 2011

(30) Foreign Application Priority Data

Aug. 27, 2009 (EP) .................................... 09168821

(51) Int. Cl.
*B62D 29/00* (2006.01)
(52) U.S. Cl.
CPC .................................... *B62D 29/002* (2013.01)
USPC .................................................... 296/187.02
(58) Field of Classification Search
USPC ............. 296/29, 30, 187.01, 187.02, 187.08, 296/203.01, 204, 209
See application file for complete search history.

(56) References Cited

U.S. PATENT DOCUMENTS

| | | | | |
|---|---|---|---|---|
| 6,092,864 | A * | 7/2000 | Wycech et al. | 296/204 |
| 6,165,588 | A * | 12/2000 | Wycech | 428/122 |
| 6,247,287 | B1 * | 6/2001 | Takabatake | 52/843 |
| 6,358,584 | B1 * | 3/2002 | Czaplicki | 428/36.5 |
| 6,880,657 | B2 * | 4/2005 | Schneider et al. | 180/68.5 |
| 7,364,221 | B2 * | 4/2008 | Tahri et al. | 296/187.02 |
| 7,790,280 | B2 * | 9/2010 | Busseuil et al. | 428/304.4 |
| 2002/0033618 | A1 * | 3/2002 | Kwon | 296/203.03 |
| 2002/0160130 | A1 | 10/2002 | Sheldon et al. | |
| 2003/0235675 | A1 * | 12/2003 | Wycech | 428/122 |
| 2004/0026960 | A1 * | 2/2004 | Czaplicki et al. | 296/187.02 |
| 2005/0218697 | A1 * | 10/2005 | Barz et al. | 296/187.02 |
| 2008/0143143 | A1 * | 6/2008 | Brennecke | 296/187.01 |
| 2009/0091157 | A1 * | 4/2009 | Niezur et al. | 296/187.02 |

FOREIGN PATENT DOCUMENTS

| | | | |
|---|---|---|---|
| EP | 1435320 A2 | 7/2004 | |
| WO | WO-2004/094215 A1 | 11/2004 | |

OTHER PUBLICATIONS

European Search Report for EP09168821.

* cited by examiner

*Primary Examiner* — Glenn Dayoan
*Assistant Examiner* — Jason S Daniels
(74) *Attorney, Agent, or Firm* — Harness, Dickey & Pierce, PLC

(57) ABSTRACT

A reinforcer for installation in a structural member is disclosed. The reinforcer includes a rigid carrier having at least a first surface and a second surface. The first surface is substantially orthogonal to said second surface. Bonding material is disposed both on said first surface and said second surface. The reinforcer is configured to be installed in a structural member such that the first surface is substantially parallel to a longitudinal axis of the structural member, and the second surface is substantially orthogonal to the longitudinal axis of the structural member.

12 Claims, 7 Drawing Sheets

STRUCTURAL REINFORCER WITH BONDING MATERIAL ON ORTHOGANAL SURFACES

CROSS-REFERENCE TO RELATED APPLICATION

This application claims priority to a European patent application No. 09168821.8 filed on Aug. 27, 2009, which is hereby incorporated by reference in its entirety.

BACKGROUND

Structural reinforcers are used in various industries to provide structural support to or reduce noise and/or vibrations in various products. For example, in the automotive industry, a reinforcer may be used to reinforce beams, pillars, rails, nodes, doors, or roof of the vehicle. Known reinforcers commonly include a rigid carrier member and a structural foam or structural adhesive (collectively herein, "bonding materials") disposed at select locations on the outer surface of the carrier. The carrier is sometimes made from metal, plastic, glass filled or hybrid metal plastic, or hybrid plastic fiber mat, plastic. The bonding material is commonly in an unexpanded state when the reinforcer is manufactured, but configured to expand in response to an activator, such as heat, and bond to the surfaces of the structural member. In the automobile context, the activating heat is commonly provided when the vehicle is process through the paint booth.

Several known reinforcer configurations are shown in FIGS. 1A-1C. Each of FIG. 1A-1C is a cross-sectional end view of a reinforcer 10 positioned inside of a channel 12. The reinforcer 10 includes a carrier member 14 and bonding material 16 disposed at select locations thereon. In each embodiment, the bonding material 16 is disposed on the exterior longitudinal walls of the carrier 14, extending along the length of the carrier member 14. Notably, in these embodiments, there is no bonding material disposed on any surfaces of the carrier that are substantial orthogonal to the longitudinal axis of the structural member 12 or the reinforcer 10.

The inventors hereof have developed a reinforcer with an improved configuration of bonding material applied to the carrier, which results in improved performance of the reinforcer.

SUMMARY

A reinforcer for installation in a structural member is disclosed. The reinforcer includes a rigid carrier having at least a first surface and a second surface. The first surface is substantially orthogonal to said second surface. Bonding material is disposed both on said first surface and said second surface. The reinforcer is configured such that, when installed into a structural member, the bonding material on the first and second surfaces bond, respectively, to a surface of the structural member that is substantially parallel to the longitudinal axis of the structural member and to a surface that is substantially orthogonal to the longitudinal axis of the structural member.

BRIEF DESCRIPTION OF THE DRAWINGS

The foregoing description will be understood more completely from the following detailed description of the exemplary drawings, in which.

DETAILED DESCRIPTION

An improved reinforcer is described. The reinforcer includes a rigid carrier member and structural foam or adhesive (collectively herein, "bonding material") disposed at selected locations on the outer surface of the carrier member. The carrier member is sometimes made from metal, plastic, glass filled or hybrid metal plastic, or hybrid plastic fiber mat, plastic. The bonding material is commonly in an unexpandable state (case structural foam) or malleable uncured state (case adhesive) when the reinforcer is assembled, but configured to expand and cure or being squeezed in the assembly process and cure in response to an activator, such as heat. The reinforcer is intended to be installed within the open cavity of a structural member, such as a column, channel or pillar in an automobile, for example. Bonding material is applied to at least two surfaces of the carrier that are orthogonal to each other. The first surface is configured to be installed substantially parallel with the longitudinal axis of the structural member. The second surface is configured to be installed substantially orthogonal to the longitudinal axis of the structural member. The bonding material is configured to bond to orthogonal surfaces of the structural member. For purposes of this patent, "substantially orthogonal" means forming an angle with the primary longitudinal axis of the structural member that is preferably about 90 degrees, but may also be as small as 60 or 45 degrees and as large as 120 or 135 degrees.

Figure 1A:
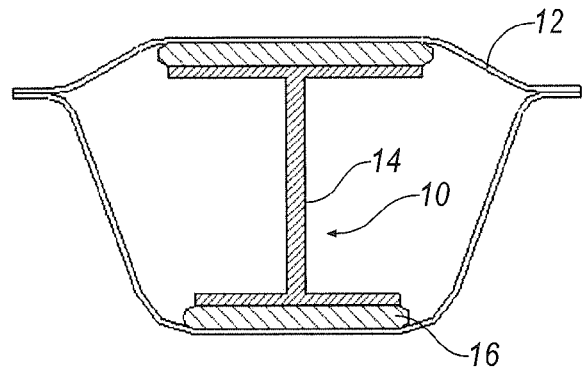
FIGS. 1A-1C are cross-sectional views of known reinforcers.
Figure 1B:
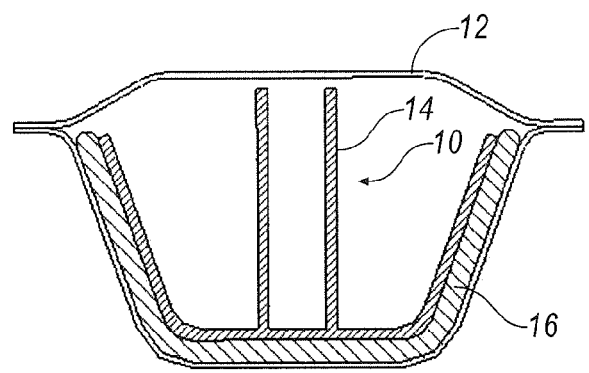
Figure 1C:
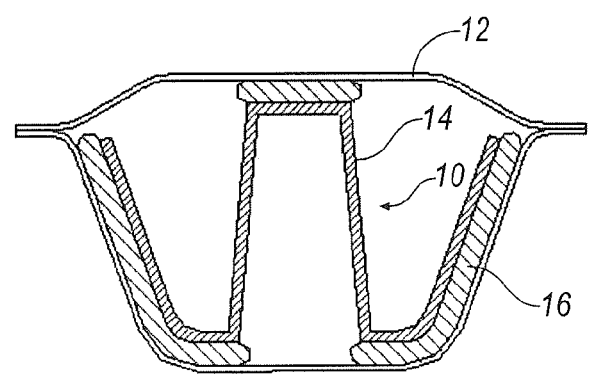
Figure 2:
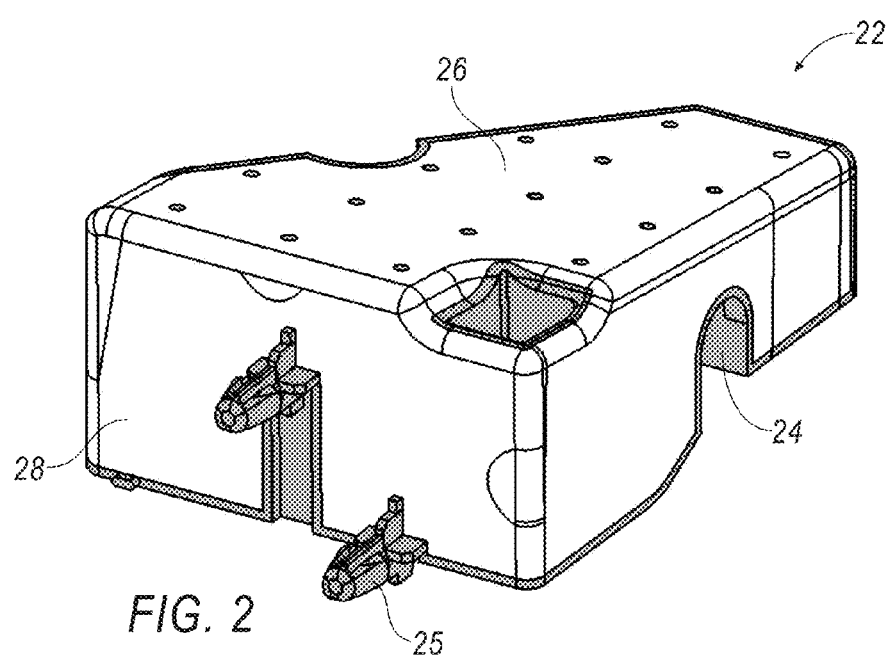
FIG. 2 is a reinforcer according to one exemplary embodiment.

FIG. 2 illustrates an embodiment of a reinforcer 22. The reinforcer 22 includes a carrier 24 and a bonding material, which is disposed at least both on a first surface 26 and a second surface 28, which are substantially orthogonal to each other. The reinforcer 22 may have bonding material on other surfaces of the carrier 24 as well. The reinforcer 22 may also include mechanical connectors 25 that can be used to mechanically attach the reinforcer 22 to a panel of a structural member.

Figure 3:
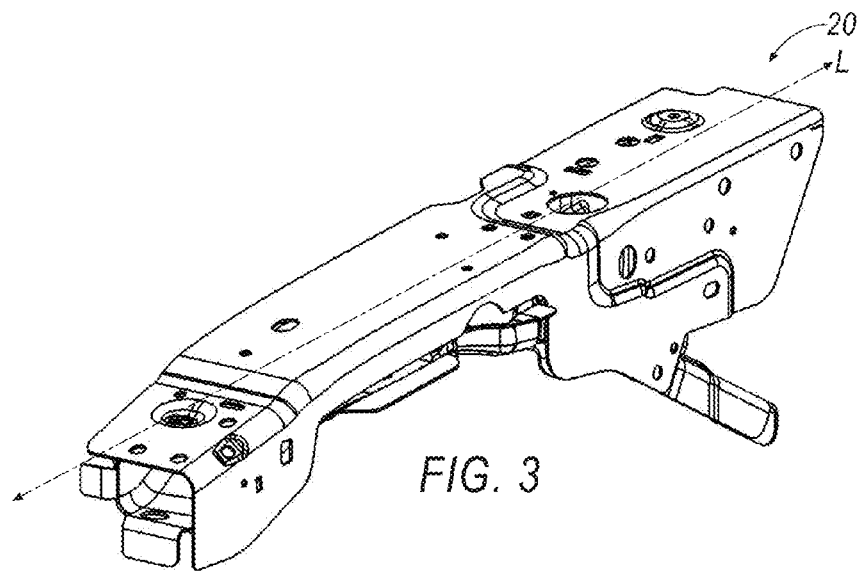
FIG. 3 illustrates an exemplary structural member.

FIGS. 3-6 collectively illustrate the reinforcer 22 installed in a structural member 20 prior to activation of the bonding material. FIG. 3 is a perspective view of a structural member 20, which in this particular case is a Front upper rail/load path (Shotgun) of an automobile. Structural member 20 has a primary longitudinal axis L.

Figure 4:
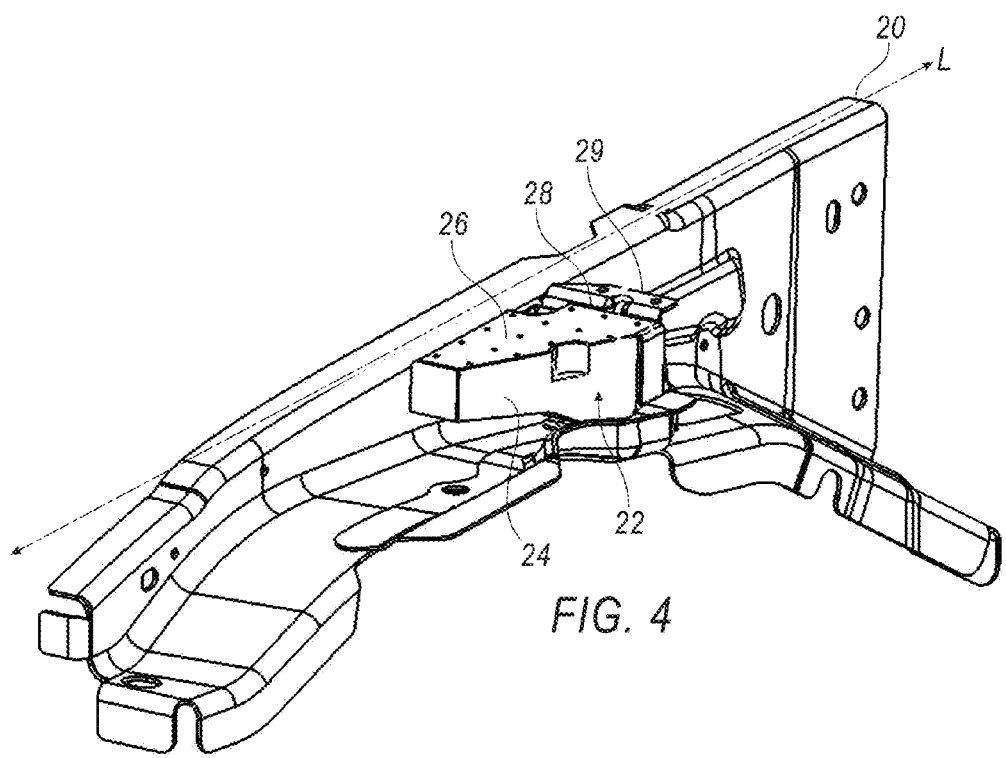
FIG. 4 illustrates the structural member of FIG. 3, with one of the outer panels removed.

FIG. 4 is a perspective view of the structural member 20 illustrated in FIG. 3, but with one of the panels of the structural member removed so that the interior of the structural member, including the reinforcer 22, can be seen. As installed, the layer of bonding material on the second surface 28 of the carrier is substantially orthogonal to the longitudinal axis L of the structural member 20. Also, the bonding material on the second surface 28 abuts a portion of the carrier 20, in this case a bracket 29, which is substantially orthogonal to the longitudinal axis L. When the bonding material is activated, it bonds to a surface of the structural member 22 that is substantially parallel to the longitudinal axis L and to a surface of the structural member that is substantially orthogonal to the longitudinal axis L, i.e. the bracket 29.

Figure 5:
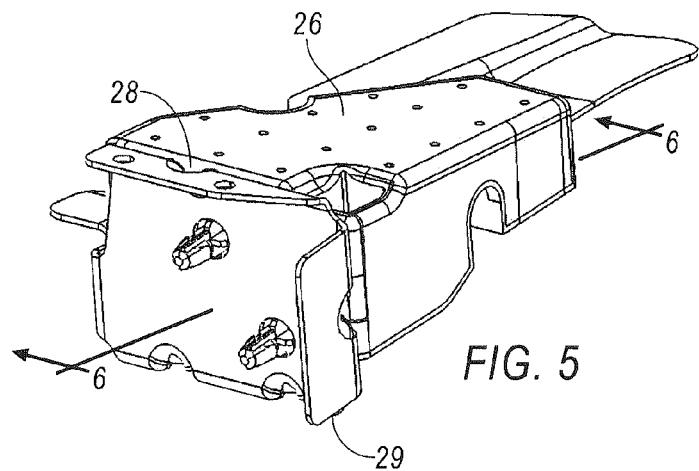
FIG. 5 illustrates the reinforcer of FIGS. 2 and 4, shown in isolation attached to a bracket of the structural member.

FIG. 5 is an isolated view of the reinforcer 22 and the bracket 29. The bonding material 28 on the orthogonal surface of the carrier 24 expands and bonds to the bracket 29 when the bonding material is activated.

Figure 6:
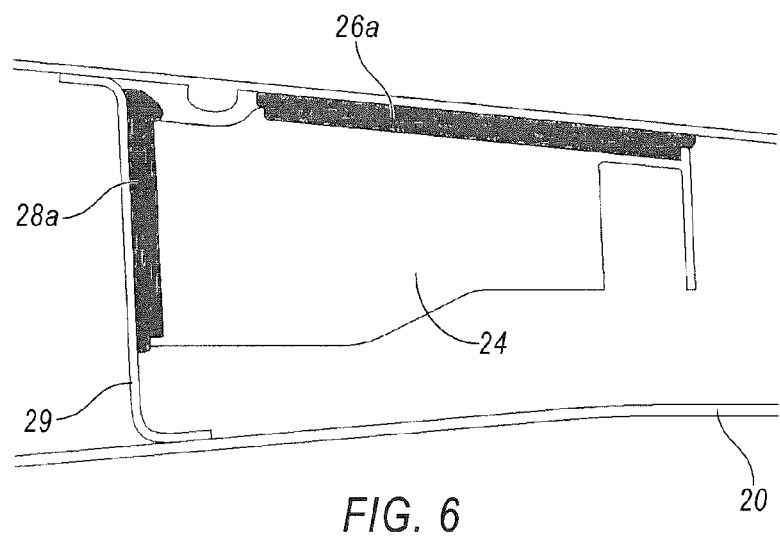
FIG. 6 is a cross-sectional view of the reinforcer shown in FIGS. 2, 4 and 5.

FIG. 6 is a cross-sectional view of the reinforcer 22 shown in FIG. 5, taken along the line 6-6. The bonding material 26a on the longitudinal surface of the carrier 24 abuts a longitudinal surface 23 of the structural member 22. The bonding material 28a on the orthogonal surface 28 of the carrier 24 abuts the bracket 29. The bonding material 26a, 28a bonds to the respective surfaces of the carrier 24 during activation. The resulting bonds formed at orthogonal surfaces of the carrier 24 and the structural member 22 result in a stronger reinforcement of the structural member 20 than if there were only bonds between the longitudinal surfaces of the carrier 24 and the longitudinal surfaces of the structural member 22.

Figure 7:
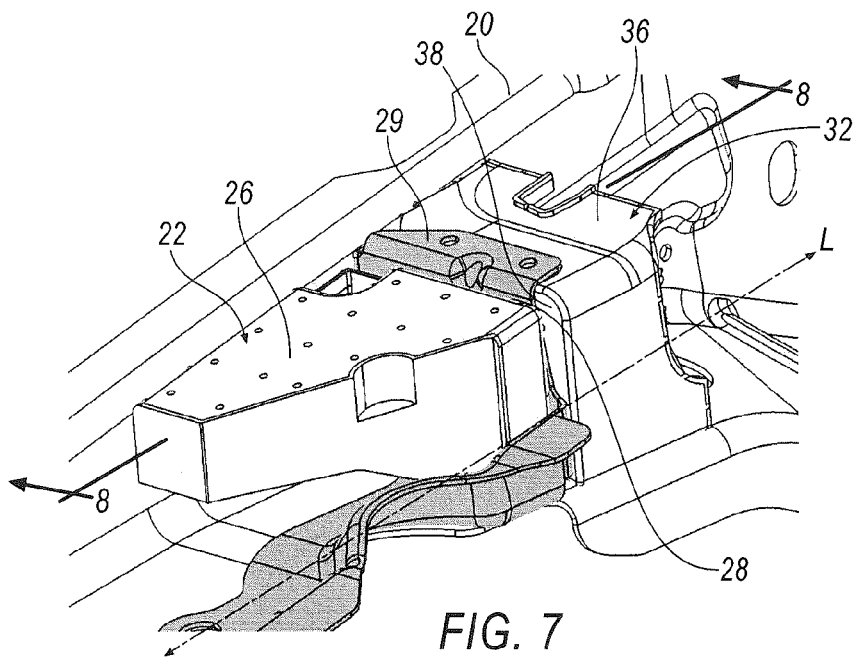
FIG. 7 is a perspective view of a second embodiment having two reinforcers positioned inside of a structural member.
Figure 8:
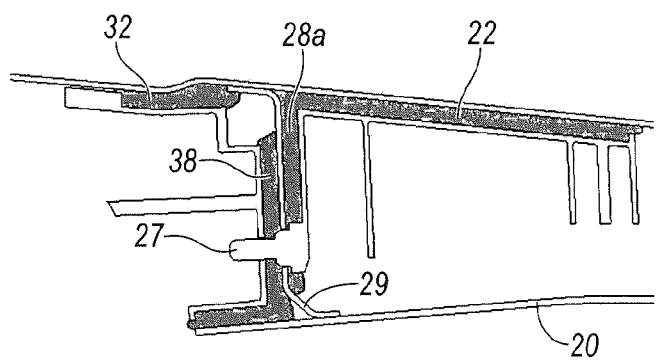
FIG. 8 is a cross-sectional view of the reinforcer arrangement shown in FIG. 7.

FIGS. 7-12 illustrate various other embodiments. FIGS. 7 and 8 are different views of an embodiment that includes two reinforcers installed in a structural member. FIG. 7 is a perspective view with a panel of the structural member 20 removed so that the interior of the structural member 20 and the installed reinforcers 22, 32 can be seen, and FIG. 8 is a sectional view of the assembly shown in FIG. 7. Structural member 20 includes bracket 29. First reinforcer 22 and second reinforcer 32 are installed in the structural member 20 on opposing sides of bracket 29. First reinforcer 22 includes first and second surfaces both with bonding material 26a, 28a disposed thereon. As with the exemplary illustration of FIG. 4, first surface 26 and second surface 28 are substantially orthogonal to each other. The second surface 28 abuts bracket 29. Similarly, second reinforcer 32 also includes two surfaces 36, 38 that are substantially orthogonal to each other and that include bonding material disposed thereon. Second surface 38 of the second reinforcer 32 abuts the bracket 29 on the opposite side as second surface 28 of the first reinforcer 22. A mechanical fastener 27 can be used to connect the first and second reinforcers 22, 32 around bracket 29. When installed, the bonding material on the first surfaces 26, 36 of both reinforcers 22, 32 bond to a surface of the structural member that is substantially parallel with the longitudinal axis L. The bonding material 26a, 28a on the second surfaces 28, 38 of both reinforcers 22, 32 bond to a surface, i.e., bracket 29, which is substantially orthogonal to the longitudinal axis L.

Figure 9:
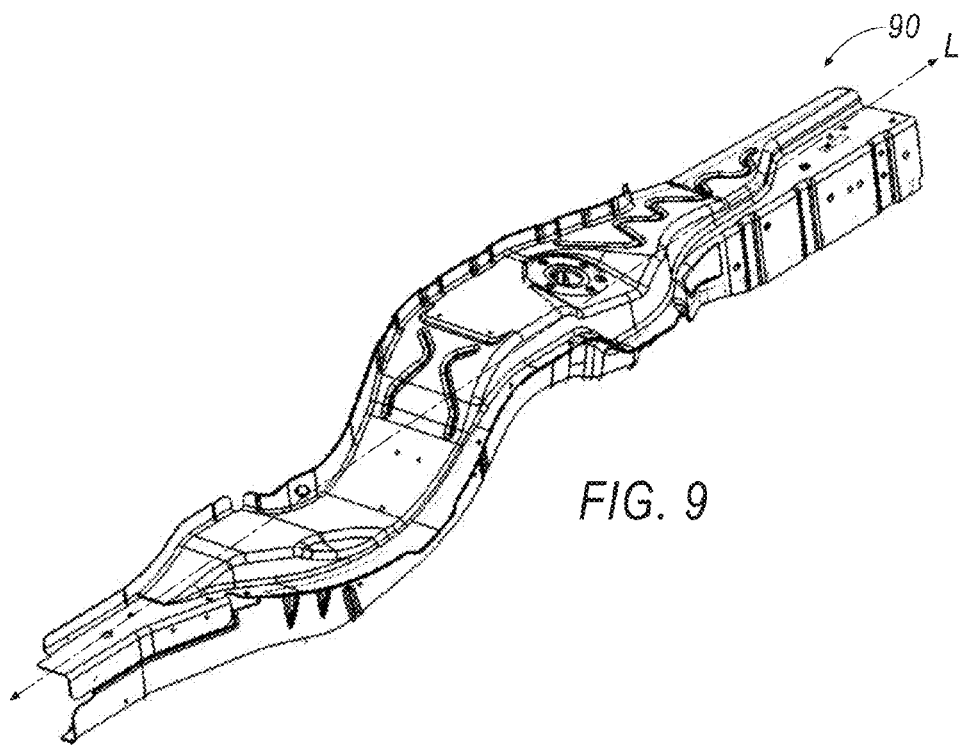
FIG. 9 is a perspective view of another embodiment of a structural member.
Figure 10:
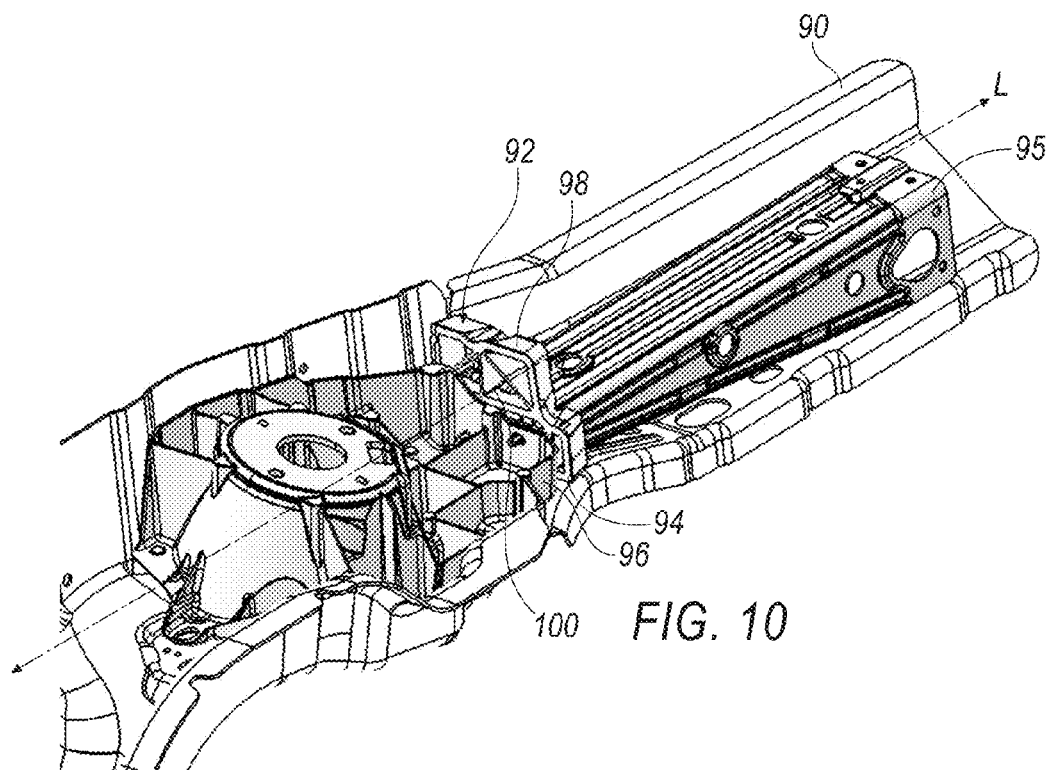
FIG. 10 is the structural member of FIG. 9, with one of the panels removed, showing the reinforcer positioned inside of the structural member.

FIGS. 9-12 illustrate another embodiment. FIG. 9 illustrates a structural member 90 having a longitudinal axis L. FIG. 10 illustrates the structural member 90 with a panel removed to see the interior of the structural member. Inside the structural member 90 is a reinforcer 92 and a reinforcement rail 95. The reinforcer 92 includes a carrier 94 with bonding material 98a, 100a disposed on first surface 98 and second surface 100, respectively, which are substantially orthogonal to each other. The second surface 100 abuts a surface 96 of the structural member 90 that is substantially orthogonal to the longitudinal axis L.

Figure 11:
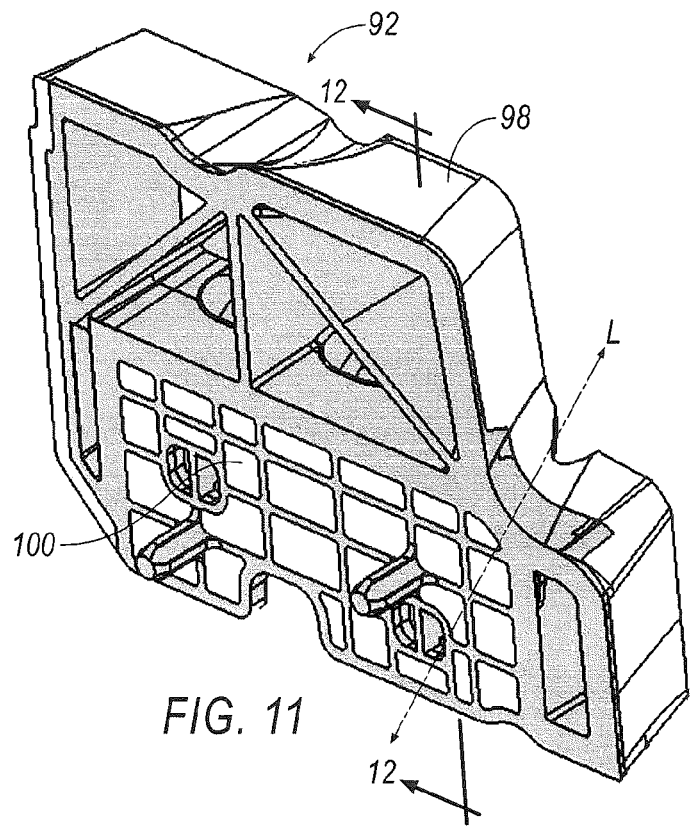
FIG. 11 shows the reinforcer of FIG. 10 in isolation.

FIG. 11 is an isolated view of the reinforcer 92, illustrating in more detail the bonding material disposed on the first and second surfaces 98, 100. As illustrated in FIG. 11, the carrier 94 can be of various configurations, including a honeycomb structure.

Figure 12:
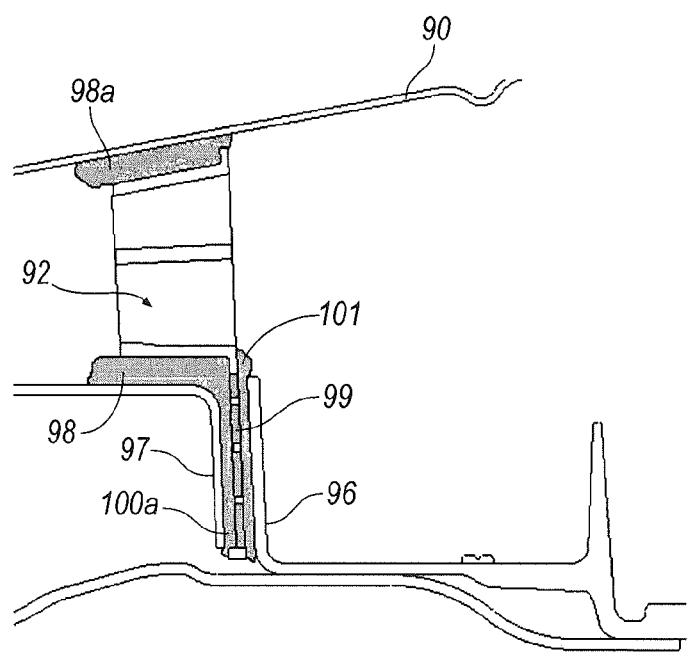
FIG. 12 is a cross-sectional view of the reinforcer in FIG. 11.

FIG. 12 is a cross-sectional view of the reinforcer 92 shown in FIG. 11, installed in structural member 90. FIG. 12 best illustrates that carrier member 94 includes a planar member 99, with bonding material disposed on both sides 100, 101 of planar member 99. The bonding material on the first surface 98 is configured to bond to a surface of the structural member 90 that is substantially parallel to longitudinal axis L. The bonding material on the opposite sides of planar member 99 is sandwiched between two planar members 96, 97 of structural member 90 that are substantially orthogonal to the longitudinal axis L.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A structural member sub-assembly, comprising:
a first reinforcer having a rigid carrier and a bonding material disposed on a first outer surface and on a second outer surface of said carrier of said first reinforcer, said first and second outer surfaces of said carrier of said first reinforcer each being disposed along and facing outwardly from an outermost perimeter of said carrier of said first reinforcer, and said second outer surface being substantially orthogonal to said first outer surface such that a first portion of the bonding material disposed on the first outer surface of said carrier of said first reinforcer is configured to bond to a first surface of a structural member receiving the sub-assembly, and a second portion of the bonding material disposed on the second outer surface of said carrier of said first reinforcer is configured to bond to a second surface of the structural member receiving the sub-assembly, wherein the second surface of the structural member is substantially orthogonal to the first surface of the structural member;

a second reinforcer having a rigid carrier and a bonding material disposed on a first outer surface and on a second outer surface of said carrier of said second reinforcer, said second outer surface being substantially orthogonal to said first outer surface such that a first portion of the bonding material disposed on the first outer surface of said carrier of said second reinforcer is configured to bond to a third surface of the structural member receiving the sub-assembly, and a second portion of the bonding material disposed on the second outer surface of said carrier of said second reinforcer is configured to bond to a fourth surface of the structural member receiving the sub-assembly, wherein the third surface of the structural member is substantially orthogonal to the fourth surface of the structural member; and a bracket connected to said respective-second surfaces of said first and second reinforcers.

2. The structural member sub-assembly of claim 1, wherein said first carrier and the second carrier are made from one of the following: metal, plastic, glass filled or hybrid metal plastic, or hybrid plastic fiber mat.

3. The structural member sub-assembly of claim 1, wherein said bonding material comprises one of the following: structural foam and heat curable adhesive.

4. The structural member sub-assembly of claim 1, wherein the structural member forms an open cavity in an automobile.

5. The structural member sub-assembly of claim 1, wherein at least one of said first carrier and said second carrier comprises a honeycomb structure.

6. The structural member sub-assembly of claim 1, wherein said first reinforcer, said second reinforcer and said bracket are connected together by a mechanical connector.

7. The structural member sub-assembly of claim 1, wherein said bracket is configured to be attached to a structural member.

8. A structural member sub-assembly comprising:
a first reinforcer having a rigid carrier and a bonding material disposed on a first outer surface and on a second outer surface of said carrier of said first reinforcer, said second outer surface being substantially orthogonal to said first outer surface such that a first portion of the bonding material disposed on the first outer surface of said carrier of said first reinforcer is configured to bond to a first surface of a structural member receiving the sub-assembly, and a second portion of the bonding material disposed on the second outer surface of said carrier of said first reinforcer is configured to bond to a second surface of the structural member receiving the sub-assembly, wherein the second surface of the structural member is substantially orthogonal to the first surface of the structural member;

a second reinforcer having a rigid carrier and a bonding material disposed on a first outer surface and on a second outer surface of said carrier of said second reinforcer, said second outer surface being substantially orthogonal to said first outer surface such that a first portion of the bonding material disposed on the first outer surface of said carrier of said second reinforcer is configured to bond to a third surface of the structural member receiving the sub-assembly, and a second portion of the bonding material disposed on the second outer surface of said carrier of said second reinforcer is configured to bond to a fourth surface of the structural member receiving the sub-assembly, wherein the third surface of the structural member is substantially orthogonal to the fourth surface of the structural member; and a bracket connected to said respective-second surfaces of said first and second reinforcers;

wherein at least one of the first and second reinforcers includes a planar member defining first and second opposing surfaces, the first opposing surface having a first portion of the bonding material applied thereto, the second opposing surface having a second portion of the bonding material applied thereto, and the planar member extending away such that the planar member is configured to be inserted between first and second parallel surfaces of the structural member such that the first portion of the bonding material is configured to bond to the first parallel surface of the structural member, and the second portion of the bonding material is configured to bond to the second parallel surface of the structural member.

9. A method of assembling a structural member sub-assembly, comprising:
installing a first reinforcer in the structural member, the first reinforcer having a rigid carrier and a bonding material disposed on a first outer surface and on a second outer surface of said carrier, said first and second outer surfaces of said carrier of said first reinforcer each being disposed along and facing outwardly from an outermost perimeter of said carrier of said first reinforcer, and said second surface being substantially orthogonal to said first surface such that a first portion of the bonding material disposed on the first outer surface of said carrier of said first reinforcer is configured to bond to a first surface of a structural member receiving the sub-assembly, and a second portion of the bonding material disposed on the second outer surface of said carrier of said first reinforcer is configured to bond to a second surface of the structural member receiving the sub-assembly, wherein the second surface of the structural member is substantially orthogonal to the first surface of the structural member, and installing a second reinforcer in the structural member, the reinforcer having a rigid carrier and a bonding material disposed on a first surface and on a second surface, said second surface of the second reinforce being substantially orthogonal to said first surface of the second reinforcer such that a first portion of the bonding material disposed on the first outer surface of said carrier of said second reinforcer is configured to bond to a third surface of the structural member receiving the sub-assembly, and a second portion of the bonding material disposed on the second outer surface of said carrier of said second reinforcer is configured to bond to a fourth surface of the structural member receiving the sub-assembly, wherein the third surface of the structural member is substantially orthogonal to the fourth surface of the structural member, wherein a bracket connects said first reinforcer to said second reinforcer; and activating said bonding material to cause it to bond said first and second surfaces of said carriers of said first and second reinforcers and to corresponding surfaces of the bracket.

10. The method of claim 9, wherein said activating step comprises applying heat above a pre-determined threshold level.

11. The method of claim 9, wherein said activating step comprises applying heat in connection with the application of paint to an automotive vehicle.

12. A method of assembling a structural member sub-assembly comprising:

installing a first reinforcer in the structural member, the first reinforcer having a rigid carrier and a bonding material disposed on a first outer surface and on a second outer surface, said second surface being substantially orthogonal to said first surface such that a first portion of the bonding material disposed on the first outer surface of said carrier of said first reinforcer is configured to bond to a first surface of a structural member receiving the sub-assembly, and a second portion of the bonding material disposed on the second outer surface of said carrier of said first reinforcer is configured to bond to a second surface of the structural member receiving the sub-assembly, wherein the second surface of the structural member is substantially orthogonal to the first surface of the structural member, and installing a second reinforcer in the structural member, the reinforcer having a rigid carrier and a bonding material disposed on a first surface and on a second surface, said second surface of the second reinforce being substantially orthogonal to said first surface of the second reinforcer such that a first portion of the bonding material disposed on the first outer surface of said carrier of said second reinforcer is configured to bond to a third surface of the structural member receiving the sub-assembly, and a second portion of the bonding material disposed on the second outer surface of said carrier of said second reinforcer is configured to bond to a fourth surface of the structural member receiving the sub-assembly, wherein the third surface of the structural member is substantially orthogonal to the fourth surface of the structural member, wherein a bracket connects said first reinforcer to said second reinforcer; and activating said bonding material to cause it to bond said first and second surfaces of said carriers of said first and second reinforcers and to corresponding surfaces of the bracket;

wherein at least one of the first and second reinforcers includes a planar member defining first and second opposing surfaces, the first opposing surface having a first portion of the bonding material applied thereto, the second opposing surface having a second portion of the bonding material applied thereto, and the planar member extending away such that the planar member is configured to be inserted between first and second parallel surfaces of the structural member such that the first portion of the bonding material is configured to bond to the first parallel surface of the structural member, and the second portion of the bonding material is configured to bond to the second parallel surface of the structural member.

* * * * *